US006665658B1

(12) United States Patent
DaCosta et al.

(10) Patent No.: US 6,665,658 B1
(45) Date of Patent: Dec. 16, 2003

(54) SYSTEM AND METHOD FOR AUTOMATICALLY GATHERING DYNAMIC CONTENT AND RESOURCES ON THE WORLD WIDE WEB BY STIMULATING USER INTERACTION AND MANAGING SESSION INFORMATION

(75) Inventors: Jillian I. DaCosta, Jamaica, NY (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,790

(22) Filed: Jan. 13, 2000

(51) Int. Cl.[7] .............................................. G06F 17/30
(52) U.S. Cl. ............................ 707/3; 707/10; 707/201; 709/217; 709/218; 715/513
(58) Field of Search ............................... 707/1–10, 200, 707/201; 715/513; 709/217, 218

(56) References Cited

U.S. PATENT DOCUMENTS

| | | | | | |
|---|---|---|---|---|---|
| 5,855,020 A | * | 12/1998 | Kirsch | ........................ | 707/10 |
| 5,894,554 A | * | 4/1999 | Lowery et al. | ............. | 709/203 |
| 5,956,716 A | * | 9/1999 | Kenner et al. | ................ | 707/10 |
| 6,012,087 A | * | 1/2000 | Freivald et al. | ............. | 709/218 |
| 6,012,098 A | * | 1/2000 | Bayeh et al. | ................ | 709/246 |
| 6,064,977 A | * | 5/2000 | Harerstock et al. | ............ | 705/9 |
| 6,073,135 A | * | 6/2000 | Broder et al. | .................. | 707/10 |
| 6,154,738 A | * | 11/2000 | Call | .............................. | 707/4 |
| 6,182,097 B1 | * | 1/2001 | Hansen et al. | ............... | 707/526 |
| 6,202,062 B1 | * | 3/2001 | Cameron et al. | ............... | 707/3 |
| 6,263,332 B1 | * | 7/2001 | Nasr et al. | ...................... | 707/5 |
| 6,269,370 B1 | * | 7/2001 | Kirsch | ......................... | 707/10 |
| 6,279,006 B1 | * | 8/2001 | Shigemi et al. | ............. | 707/101 |
| 6,289,333 B1 | * | 9/2001 | Jawahar et al. | ................ | 707/2 |
| 6,311,194 B1 | * | 10/2001 | Sheth et al. | ................. | 707/505 |
| 6,327,589 B1 | * | 12/2001 | Blewett et al. | ................ | 707/5 |
| 6,356,906 B1 | * | 3/2002 | Lippert et al. | ................ | 707/10 |
| 6,366,934 B1 | * | 4/2002 | Cheng et al. | ............... | 707/513 |
| 6,397,219 B2 | * | 5/2002 | Mills | ........................... | 707/10 |
| 6,418,448 B1 | * | 7/2002 | Sarkar | ..................... | 707/104.1 |
| 6,421,656 B1 | * | 7/2002 | Cheng et al. | .................. | 707/2 |
| 6,456,308 B1 | * | 9/2002 | Agranat et al. | ............. | 715/513 |

* cited by examiner

*Primary Examiner*—Shahid Al Alam
*Assistant Examiner*—Anh Ly
(74) *Attorney, Agent, or Firm*—Delio & Peterson

(57) ABSTRACT

An apparatus and method for a web crawler to automatically simulate user interaction with a dynamic website in order to gather and extract information from the site. This interactive web crawler will be able to create a search query string for any one of a number of desired search topics and systematically crawl dynamic personalized content on a website and retrieve the information desired by the user/client.

20 Claims, 3 Drawing Sheets

SYSTEM AND METHOD FOR AUTOMATICALLY GATHERING DYNAMIC CONTENT AND RESOURCES ON THE WORLD WIDE WEB BY STIMULATING USER INTERACTION AND MANAGING SESSION INFORMATION

BACKGROUND OF THE INVENTION

1. Field of the Invention

The present invention is related to the area of Internet search technologies and resource gathering using web crawling techniques, and in particular to a method and apparatus for automatically gathering dynamic content and resources on the world wide web by simulating user interaction and managing session information.

2. Description of Related Art

In the early beginning of the Internet, most web sites served static pages and content. The format of these pages are typically represented in HTML (Hypertext Markup Language), and the contents do not change unless modified by the site administrator or provider. Internet search providers use standard web crawling techniques to provide search facilities to collect static data from these websites and to summarize and index the data. The trend today is moving forward to dynamically created web pages using scripting technologies on the server side (e.g. Active Server Pages, CGI, etc.). Database content is made available through web gateways. Web gateways process information requests and return the requested page or document to the user. Standard web crawling techniques are not sufficient to gather dynamic content.

Some websites generate dynamic content and require user input/interaction to access the data. These sites are typically shopping or password protected sites providing personalization features based on specific user input. In order to keep track of user preferences, personal data, and passwords, these sites issue "cookies" to store status information. A "cookie" is data that is stored on a users machine and is read by the server that sets it. The server reads the cookie when the user returns to a site and the site is then personalized with a greeting such as "Welcome Back John Doe". This user will not be able to navigate the site unless that cookie is read from their machine.

The main problem is that these dynamic web sites provide valuable content and information, which is not possible to automatically gather and index using existing technologies. However, it would be very valuable if this data were available and indexed for other meta search engines to search. For example, consider a database of books found at the website of "AMAZON.COM"® (http://www.amazon.com). This database contains data on millions of books, which may include the name of the book, the author, as well as an abstract or summary of the book. But more importantly, the database also contains reviews about these books, written by people who actually read the book. This site makes extensive use of personalization features and cookies, which we can describe as an interactive behavior containing session information. When a user or client visits the "AMAZON.COM" site, the "AMAZON.COM" server tries to set a "cookie", which has to be accepted by the client. Many web browsers have automatic functionality built in which will handle this, and asks the user whether to accept or reject the cookie request. The standard web crawler is not able to systematically crawl the site and replicate the database because of the need for user interaction. There is no mechanism to simulate the user's behavior, or interaction, during a typical search session.

There are many more databases of books, such as "BarnesAndNoble.com", and "FatBrain.com." Essentially, the basic book data they keep is similar, however any additional information they provide may vary and could provide useful insights to one seeking information on a particular book. Thus, it would be of great benefit for a web browser or crawler to be able to navigate these sites, among others, and automatically retrieve and process the content and information available.

In another example, a domain specific search engine like "jCentral" from IBM, (http://www.ibm.com/developer/ibm), which is focused on the programming language "Java", might be interested in providing a search feature for books about "Java." So it would be a benefit for software developers if "jCentral" could create an index of the data on "Java" which is stored on "AMAZON.COM", and provide a domain specific search for interested "Java" developers. In order for "jcentral" to be able to perform such a search on a website such as "AMAZON.COM", it is necessary for "jCentral" to be able to navigate and interact with the dynamic website. However, standard web crawling techniques cannot automatically simulate the necessary user interaction required to navigate the sites and retrieve the desired information and content from the website.

Bearing in mind the problems and deficiencies of the prior art, it is therefore an object of the present invention to provide an apparatus and method to automatically simulate user interaction with a dynamic website.

It is another object of the present invention to provide an apparatus and method for a webcrawler to automatically simulate interactive behavior of a user in order to search and query dynamic websites.

A further object of the invention is to provide an apparatus and method for a webcrawler to automatically simulate interactive behavior of a user in order to gather and extract information from a dynamic website.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, an automated method of gathering dynamic content and resources on the world wide web by simulating user interaction and managing session information. The method comprises the steps of identifying at least one uniform resource locator ("URL"), a document type definition ("DTD") for the URL and at least one search topic to be searched on the URL. The URL is queried with the URL, DTD and at least one search topic and the results are returned. In the preferred embodiment, after retrieving at least one result of the query, it is determined if there is another search topic to search the URL with. If so, another query of the URL is performed with the additional search topic, and the results are returned. In the preferred embodiment, these steps are repeated until all search topics have been searched on the site.

In the preferred embodiment, after the step of identifying at least one search topic to be searched, a query template is formed using the URL, DTD and search topic to complete a search query string. The search query string is adapted to be submitted to the URL to perform a hypertext transfer protocol request.

After the step of retrieving at least one search result, it is also preferred to determine if additional search results are available, and if so, to perform a page navigation to retrieve the additional search results. This page navigation may be repeated until all search results have been retrieved.

In another aspect, the present invention is directed to an article of manufacture comprising a computer usable medium having computer readable program code means for automatically gathering dynamic content and resources on the world wide web by simulating user interaction and managing session information. The computer readable program code means in the article of manufacture comprises computer readable program code means to identify a URL for a website to be queried, computer readable program code means to identify a data type definition for the URL, computer readable program code means to identify at least one search topic to be searched on the URL, and computer readable program code means to query the URL with the DTD and at least one search topic, and computer readable program code means to retrieve the results of the query.

In the preferred embodiment, the article further comprises computer readable program code means to determine if the URL is to be searched with additional search topics and computer readable program code means to perform additional queries of the URL until all topics have been searched, and computer readable program code means to retrieve all search results.

It is also preferred that the article of manufacture comprise computer readable program code means to form a query template using the URL, DTD and search topic to complete a search query string, which is adapted to be submitted to the URL to perform a hypertext transfer protocol request.

In the preferred embodiment the article further comprises computer readable program code means for determining if additional search results are available and computer readable program code means for performing a page navigation to retrieve all search results.

In another aspect, the present invention is directed to a computer program product comprising a computer usable medium having computer readable program code means embodied in the medium for automatically gathering dynamic content and resources on the world wide web by simulating user interaction and managing session information. The computer program product includes computer readable program code means for causing a computer to identify a URL for a website to be queried, identify a data type definition for the URL, identify at least one search topic to be searched on the URL, and conduct a search using the URL, DTD and search topic. The present invention also includes computer readable program code means for causing a computer to retrieve the results of the query and perform a page navigation in order to retrieve all the search results. In the preferred embodiment, the present invention also includes computer readable program code means to determine if the URL is to be searched with a second search topic to perform additional queries until all search topics have been searched.

In the preferred embodiment, the computer program product further comprises computer readable program code means for causing a computer to form a query template using the URL, DTD and search topic to complete a search query string to be submitted to the URL to perform a hypertext transfer protocol request.

In another aspect, the present invention is directed to a computer program product for automatically gathering dynamic content and resources on the world wide web comprising a computer usable medium having computer readable program code means embodied in the medium for causing a computer to simulate user interaction and managing session information with a website. In the preferred embodiment, the computer program product includes computer readable program code means for causing a computer to determine at least one website with a URL to be searched and a document type definition for the website and to create a query search string for a website using the uniform resource locator and document type definition. In the preferred embodiment, the computer program product includes computer readable program code means for causing a computer to determine at least one search topic to be searched on the website, to insert the topic into the query string, to query the website with the query string, and to receive the results of the query.

In the preferred embodiment, the computer program product includes computer readable program code means for causing a computer to determine if there are additional search topics to be searched, and to repeat the foregoing process for each additional search topic until all search topics are searched.

In another aspect, the present invention is directed to an automated method of gathering content and information from a dynamic website comprising the steps of: identifying a uniform resource locator ("URL") for a website to be searched, determining if the URL is a dynamic website, obtaining a session data for the URL, formatting a search query string using the session data and a document type definition for the URL, formatting the search query string with a first topic to be searched to form a first search query string, performing a hypertext transfer protocol request of the website with the first search query string and processing a first set of search results for the first search query string.

In the preferred embodiment, the method further comprises determining if there are additional topics to be searched and repeating the foregoing steps for each topic until all topics are searched and all results processed.

It is also preferred that the step of determining if said URL is a dynamic website further comprise performing a hypertext transfer protocol GET method of the website, downloading a content including a header of the website, and scanning the header for the session data which may be represented by a cookie.

In another aspect the present invention is directed to an article of manufacture comprising a computer usable medium having computer readable program code means for automatically gathering content and information from a dynamic website comprising computer readable program code means to identify a URL for a website to be queried, to determine if the URL is a dynamic website, to obtain a session data for the URL, to format a search query string using the session data and a document type definition for said URL, to format the search query string with a first topic to be searched to form a first search query string, to perform a hypertext transfer protocol request of the website with the first search query string and to process a first set of search results for the first search query string.

In the preferred embodiment, the computer readable program code means to determine if the URL is a dynamic website comprises computer readable program code means for performing a hypertext transfer protocol GET method of the website, downloading a content and header of the website, and scanning the header for the session data which may be represented by a cookie.

In another aspect, the present invention is directed to a computer program product comprising a computer usable medium having computer readable program code means embodied in the medium for of gathering content and information from a dynamic website. The computer readable program code means includes means for causing a computer to identify a uniform resource locator ("URL") for a website to be searched, to determine if the URL is a dynamic website, to obtain the session data for the URL, causing a computer to format a search query string using said session data and a document type definition for said URL, to format the search query string with a first topic to be searched to form a first search query string, to perform a hypertext transfer protocol request of the website with the first search query string, and computer readable program code means for causing a computer to process the search results of the search. In the preferred embodiment, the computer readable program code means for causing a computer to determine if the URL is a dynamic website comprises computer readable program code means for causing a computer to perform a hypertext transfer protocol GET method of the website, download the content and header of the website, and scan the header for the session data which may be represented by a cookie.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
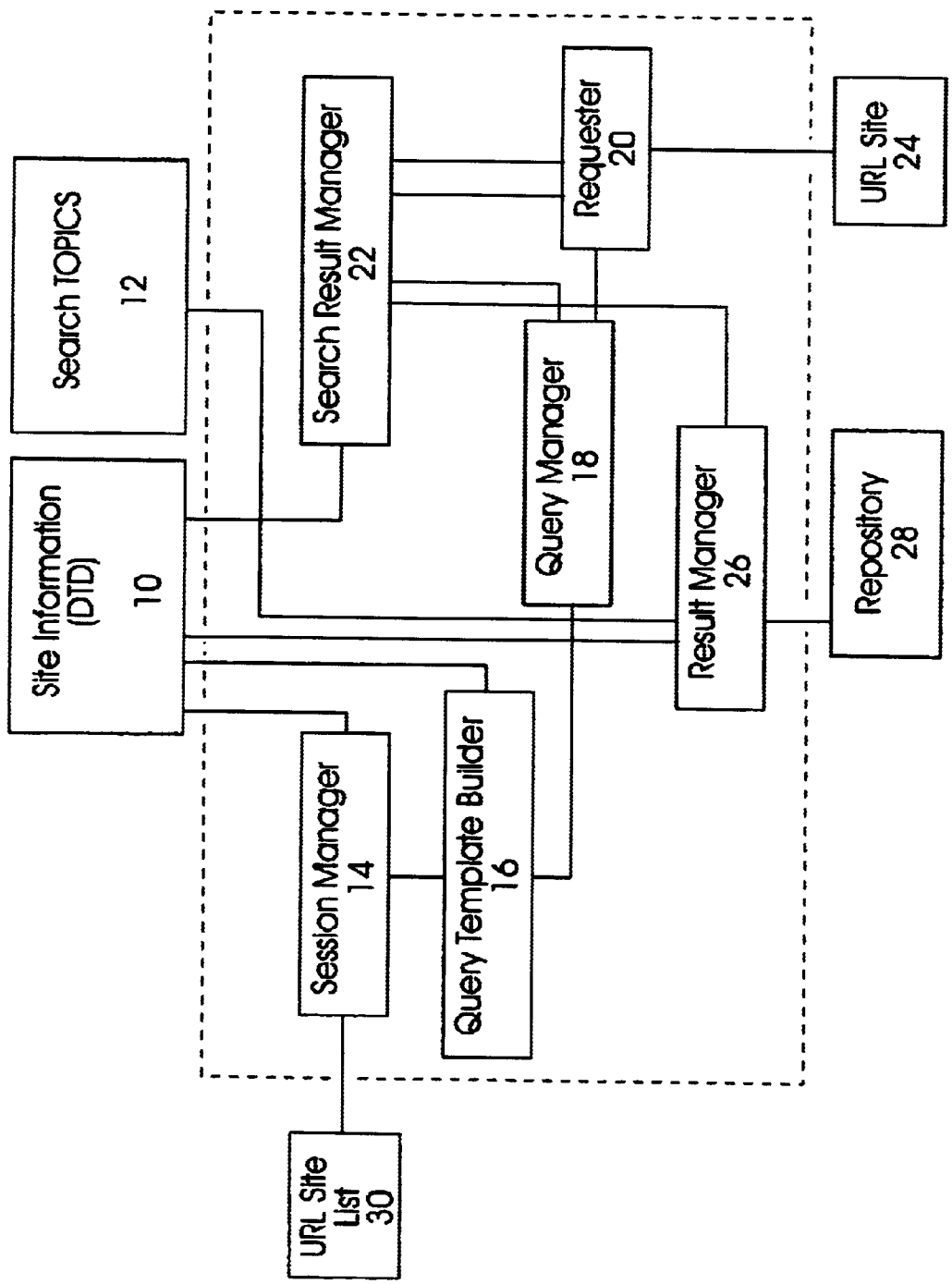
FIG. 1 is a schematic diagram of the of the present invention

In describing the preferred embodiment of the present invention, reference will be made herein to FIGS. 1–3 of the drawings in which like numerals refer to like features of the invention. Features of the invention are not necessarily shown to scale in the drawings.

The present invention provides a apparatus and method for a web crawler to automatically simulate user interaction with a dynamic website in order to gather and extract information from the website. This interactive web crawler will be able to systematically crawl dynamic personalized content on a website and retrieve the information desired by the user/client. As a result, the present invention extends the capabilities of current search engines and increases the amount of resources collected, which enhances search results. The present invention will even collect resources, which with current technologies, would have not been discovered. In essence, the present invention increases the coverage of the web, which is currently made available for search through Internet search engines. With the growing amount of information available on the Internet, it is important to keep pace with successfully delivering this useful information to users.

The system of the present invention will typically have the following assembly of components as shown in FIG. 1:

1. Session Manager 14.
2. Query Template Builder 16.
3. Query Manager 18.
4. Requester 20.
5. Search Result Manager 22.
6. Result Manager 26.

Also, the system can make use of a:

7. A database of URL sites to be analyzed 30.
8. SITE information database 10, which contains document type definition ("DTD") descriptions about dynamic web sites, how to perform interaction with the site, site navigation details, and how to extract data.
9. SEARCH TOPICS database 12, which contains a database of topics to search.
10. REPOSITORY 28, or data storage facility for storage of search results and data, and can include summaries of the content gathered from the search.

The following is a detailed description of the typical components of the present invention.

1. Session Manager 14

The Session Manager 14 will request a uniform resource locator ("URL") for a website to be searched and analyzed from URL site list 30. URL site list 30 is manually created and compiled. Typically, it may comprise a list of pages with interactive URL sites to be searched. Session manager 14 can determine whether the given website is an interactive site that sets "cookies" by performing a GET method, as defined by the hypertext transfer protocol ("HTTP"), to download the content of the website. The downloaded content may also contain a header, which has additional information about the site. The header is scanned for session data, which can be represented using "cookies." The content, along with the session data, can be stored in SITE information database 10. If it turns out that a site does not contain dynamic data, this URL is marked as "NOT INTERACTIVE" in the SITE database. In this case the site can be crawled and analyzed using standard web crawling techniques. Finally, Session Manager 14 will pass the downloaded data, along with name of the site to query, to the Query Template Builder 16.

2. Query Template Builder 16

Query Template Builder 16 obtains the URL data, along with the downloaded content or data from Session Manager 14, and constructs a query template with the session information that will be used to navigate the site. This component builds the type of query that the site requires based on the knowledge obtained from a Document Type Definition ("DTD") in the SITE information database 10. A DTD is essentially a scheme of describing of how to interact with the particular web site. The SITE database is also user created and an external software component may be utilized that automatically extracts data from web sites, but is manually configured once per site, to ensure proper functionality. Query Template Builder 16 typically has to look for HTML based form, which can easily be recognized on HTML markup tags. With the advent of XML (Extended Markup Language) it will become likely that electronic forms will also be modeled in different representations. Generally, form tags will be extracted and the value they contain will be processed. With this information, along with the session information, Query Template Builder 16 is able to automatically construct a query template for the query process. Once a query template is generated, it can be stored in the SITE database 10 for later use. Associating the session information with the query represents a key component in simulating human web browsing techniques.

3. Query Manager 18

Query Manager 18 oversees the status of each query request. This includes its validity and state. Since session information may have expiration dates, the associated query may become unavailable. Thus, Query Manager 18 must determine if a query is still valid. It also determines if another query is ready and whether the Requester 20 has completed the previous query. Query Manager 18 also retrieves the topic(s) to be searched from the Search TOPICS database 12, and inserts the topics, which can be represented as a list of keywords, into the query template to complete the query string. If there is more than one topic to be searched, a query string is completed for each topic. Each topic and query must be searched on the site. To ensure this is done, Query Manager 18 analyzes topics/queries associations. Overall, Query Manager 18 has to loop over all the search topics, to ensure that every topic will be gathered, on all the designated web sites from the database 30. The completed query template is passed to Requester 20, which then takes over to process the request. If a request is processed, it will also receive notification from the Search Result Manager 22, so that a search request can be marked as processed.

4. Requester 20

Requester 20 receives a complete query template (or query string), along with the site to query from the Query Manager 18. With this information it now knows exactly how to query the dynamic site. Then, it sends a request to the site and waits for the returned search results. Once it receives the search results, it sends the search results page to the Search Result Manager 22 for further processing. The search results may be in the form of an HTML page with URLs, or some other structured format (e.g. XML).

5. Search Result Manager 22

The Search Result Manager 22 analyzes a search result page received from the Requester 20. For this, it has to have a knowledge about the search result page structure, which will be obtained from the SITE database 10. Like the Query Manager 18, the Search Result Manager 22 can make use of tools that transfer data out of webpages to simplify the parsing of a search result page. Search Result Manager 22 is capable of page navigation and can identify additional pages of results to be retrieved. Requester 20 can continue to retrieve the additional result pages. After successfully analyzing the search results, Search Result Manager 22 is able to separate the data (e.g., URL, abstract, additional summary data provided) and the paging commands (for browsing additional search result items).

Typically, search engine sites, such as "HOTBOT" and "ALTAVISTA", provide users with a fixed result set size and only a small set will be displayed at once. This requires the Search Result Manager 22 to actually page through the search results. In some instances, there may be no search results at all. Overall, the task of Search Result Manager 22 is to manage the navigation through the search result set. If there are more search result items available, which are not shown yet, additional requests (i.e searches) have to be made, until there are no more search result items available.

To simulate the paging mechanism, the Search Result Manager 22 will use the query template, along with the paging command, and passes this information (newly constructed query) to the Requester 20. As a result, the collected data is sent to the Result Manager 26. Once a request is completed, the Result Manager 26 notifies the Query Manager 18, and becomes ready to process another series of queries.

6. Result Manager 26

Result Manager 26 performs some analysis on the results (checks for valid URLs, corrupted data, etc.). Result Manager 26 can also determine if all search topics associated with the URL have been searched or queried. If not, Result Manager 26 can instruct the Search Result Manager 22 and Query Manager 18 to execute additional searches until all topics are queried. Also, it could be possible to pass the data to a summarizer component to create metadata summary information. The received search results are in the form of a list of URL sites and associated data received from the Search Result Manager 22. If necessary, duplicated content can be discarded. Essentially, the retrieved data is stored in a repository or data storage facility 28, and is associated to the topic from the Search Topics database 12. This associations will enable the search engine to later query the system by topic, and easily locate and retrieve the gathered information from Repository 28. Repository 28 represents the "harvest" of all efforts. It can be implemented as a complete information access and retrieval system, like "GRAND-CENTRAL STATION" from IBM, to allow the platform independent access to the information, metadata and document, and provide powerful search features.

Figure 2:
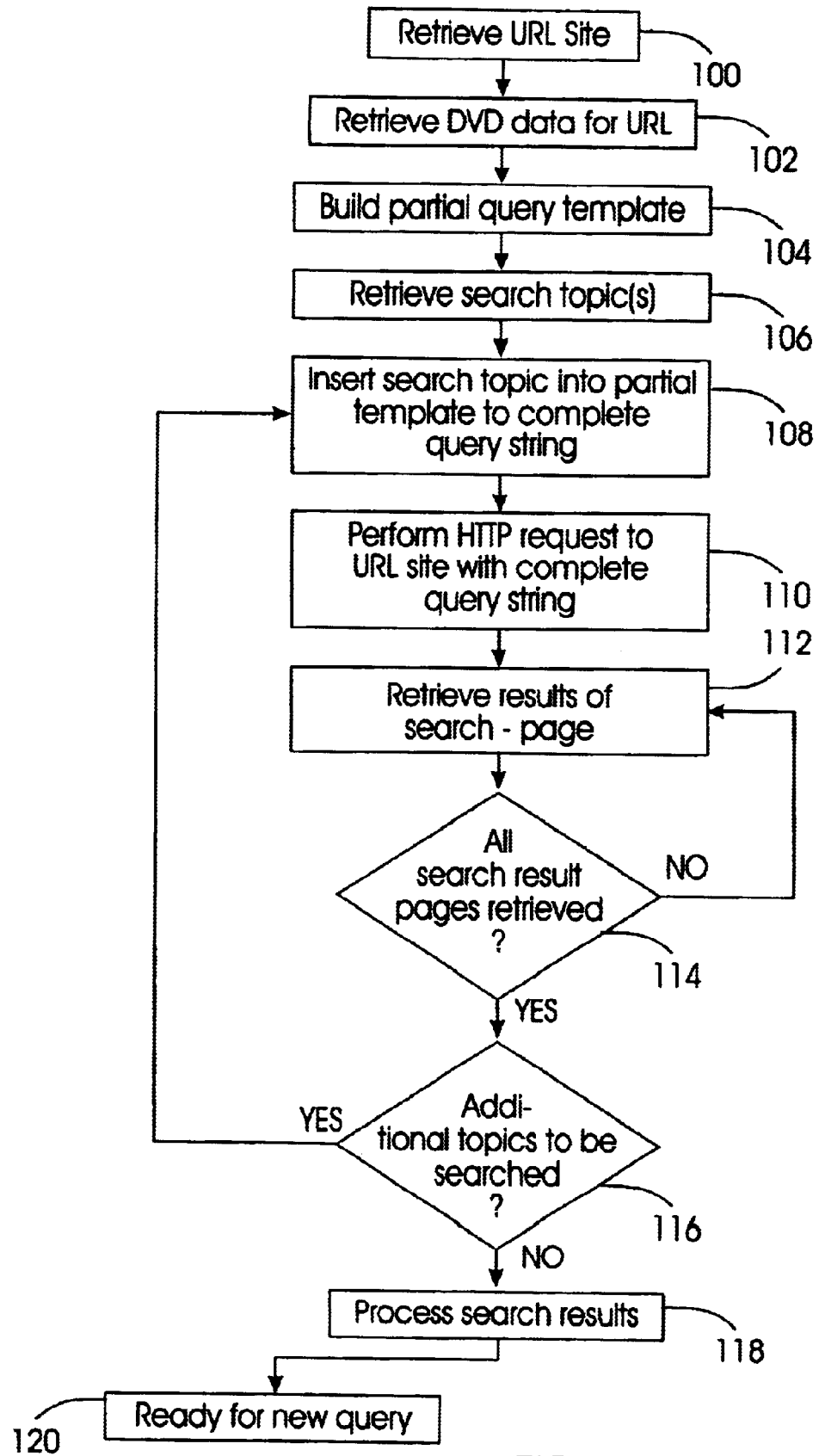
FIG. 2 is a flow chart of the process of the present invention.

Referring to FIG. 2, the process of the present invention may be implemented as follows:

Session manager 14 retrieves a URL (100) from the URL site list 30. Session manager 14 then retrieves the DTD information (102) for the retrieved URL from the Site Information database 10, which is also passed to the Query Template Builder 16. Session manager 14 then passes the retrieved URL and DTD information to the Query Template Builder 16. Query Template Builder 16 creates a query template (104) for the retrieved URL using the DTD information and passes the partial query template to the Query Template Manager 18. Query Manager 18 retrieves the topic to be searched (106) from the Search Topics database 12 and inserts the topic into the query template (108), which completes the query string. The fully completed query string is then passed to the Requester 20, which performs a HTTP request (110) to the URL site 24. Requester 20 receives the results of the query from the URL site and passes the results (112) to the Search Results Manager 22. Typically, the results of a search will contain more than one result, and many times more than one page of results. Search Results Manager 22 knows from the DTD the page structure/schemata and is able to perform page navigation. If there is more than one page of results, the Search Results Manager 22 is capable of instructing the Requester to retrieve any additional pages of results (114) and can forward the query string back to the Requester 20. This cycle is continued until all of the results of the search are retrieved and the Search Results Manger has all of the search results. The retrieved search results or data are then passed to the Results Manager 26 for processing. Results Manager 26 can determine if there are additional topics to be searched (116) and Query Manager 18 can send additional query search strings to Requester 20 for further searches. This cycle of events is continued until all search topics have been searched. For example, a search of the site "AMAZON.COM" may include searching 15 different topics, in that site. After each search, Query Manager 26 can determine from the DTD that there are additional topics to be searched. It can cause additional search topic(s) to be retrieved from the Search Topics database 12 and cause a new search string to be created for each search topic. In this fashion, Query Manager 18 can cause 15 different query strings to be created, each of which will produce a different set of search results. The search results are processed (118) by Results Manager 26, and may include notifying the Query Manger 18 that the search cycle is complete and that another search may proceed (120). Result Manager 26 may also store the search results, in for example, a data repository 28, and can also associate the search data with the DTD information and search topic categories. Results Manager 26 may also be able to extract, analyze or summarize the search results and data.

Figure 3:
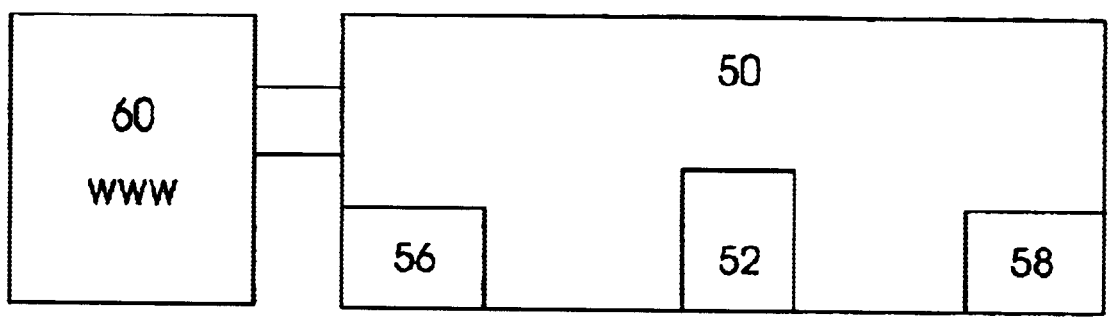
FIG. 3 is a schematic representation of the apparatus of the present invention.

FIG. 3 is a schematic representation of a typical computer system which may be used to practice the present invention. Computer systems 50 and 60 are linked such that the computers are capable of sending information to and from each computer. Information is made available to both computer systems using a communication protocol sent over a communication channel such as the Internet or through a dial-up connection, e.g., ISDN line. Computer 50 is capable of utilizing program storage devices embodying machine readable program source code which causes the computers to perform the method steps of the present invention. The program storage devices of the present invention may be devised, made and used as a component of a machine utilizing optics, magnetic properties and/or electronics to perform the method steps of the present invention. Program storage devices include, but are not limited to, magnetic diskettes, magnetic tapes, optical disks, Read Only Memory (ROM), floppy disks, semiconductor chips and the like. Database 52 may be internal or external to computer system 50 Computer 60 is linked by telephone or other conventional communication interface to the world wide web. Computer systems 50 and 60 have a microprocessor for executing stored programs and computer system 50 includes data storage device 56 on its program storage device for storage of information and data. The computer program or software incorporating the method steps and instructions described may be stored in both computer(s) and network server on an otherwise conventional program storage device. Program storage device may include such devices as a semiconductor chip, a read-only memory, or magnetic media such as a diskette or computer hard drive, which is readable and executable by a computer(s). A screen 58 is able to display the desired results accessed from the computer 50.

The present invention achieves its objectives by providing a method and apparatus to automatically "crawl" and searching dynamic websites by simulating user interaction with the website. Using the method and apparatus of the present invention, information and data that could not otherwise be automatically gathered, can now be obtained during a search and query of a dynamic website.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An automated method of gathering dynamic content and resources on the world wide web by simulating user interaction and managing session information, the method comprising the steps of:

providing a site database of dynamic websites requiring interaction to download contents thereof, said site database containing session data for the dynamic websites and document type definitions ("DTD") including descriptions of how to interact with the dynamic websites;

identifying and retrieving at least one uniform resource locator ("URL") for a dynamic website to be analyzed;

identifying and retrieving a session data and DTD for said URL from the site database;

creating a query template for the retrieved URL using said identified DTD describing how to interact with the URL to simulate user interaction;

identifying at least one search topic to be searched on said URL;

inserting said at least one search topic into said query template to form a search query string querying said URL with said query string comprising said identified DTD and said at least one search topic;

retrieving at least one result of said query, thereby automatically simulating user interaction with said dynamic website to gather and extract said at least one result.

2. The method of claim 1 further comprising the step, after the step of retrieving at least one result of said query of:

determining if said URL is to be searched with at least one additional search topic;

performing at least one additional query of said URL with said DTD and said at least one additional search topic;

retrieving at least one result of said at least one additional search topic query; and repeating the foregoing steps for a plurality of at least one additional search topic to be searched on said URL.

3. The method of claim 1 wherein said search query string is adapted to be submitted to said URL to perform a hypertext transfer protocol request.

4. The method of claim 1 further comprising the steps, after the step of retrieving at least one search result, of:

determining if additional search results are available;

performing a page navigation to retrieve at least one additional search result from at least one page of search results.

5. An article of manufacture comprising:

a site database of dynamic websites requiring interaction to download contents thereof, said site database containing session data for the dynamic websites and document type definitions ("DTD") including descriptions of how to interact with the dynamic websites; and a computer usable medium having computer readable program code means for automatically gathering dynamic content and resources on the world wide web by simulating user interaction and managing session information, the computer readable program code means in said article of manufacture comprising:

computer readable program code means to identify and retrieve a URL for a dynamic website to be queried;

computer readable program code means to identify and retrieve a session data and DTD for said URL from the site database;

computer readable program code means to create a query template for the retrieved URL using said identified DTD describing how to interact with the URL to simulate user interaction;

computer readable program code means to identify at least one search topic to be searched on said URL;

computer readable program code means to insert said at least one search topic into said query template to form a search query string;

computer readable program code means to query said URL with said query string comprising said identified DTD and said at least one search topic;

computer readable program code means to retrieve at least one result of said query, thereby automatically simulating user interaction with said dynamic website to gather and extract said at least one result.

6. The article of claim 5 further comprising:

computer readable program code means to determine if said URL is to be searched with at least one additional search topic;

computer readable program code means to perform at least one additional query of said URL with said DTD and said at least one additional search topic;

computer readable program code means to retrieve at least one result of said at least one additional query; and computer readable program code means to repeat the foregoing steps for a plurality of at least one additional search topic to be searched on said URL.

7. The article of claim 5 wherein said search query string is adapted to be submitted to said URL to perform a hypertext transfer protocol request.

8. The article of claim 5 further comprising:

computer readable program code means for determining if additional search results are available;

computer readable program code means for performing a page navigation to retrieve at least one additional search result from at least one page of search results.

9. A computer program product comprising:

a site database of dynamic websites requiring interaction to download contents thereof, said site database containing session data for the dynamic websites and document type definitions ("DTD") including descriptions of how to interact with the dynamic websites; and a computer usable medium having computer readable program code means embodied in said medium for automatically gathering dynamic content and resources on the world wide web by simulating user interaction and managing session information, said computer program product having:

computer readable program code means for causing a computer to identify and retrieve a URL for a dynamic website to be queried;

computer readable program code means for causing a computer to identify and retrieve a session data and DTD for said URL from the site database;

computer readable program code means to create a query template for the retrieved URL using said identified DTD describing how to interact with the URL to simulate user interaction;

computer readable program code means for causing a computer to identify at least one search topic to be searched on said URL;

computer readable program code means to insert said at least one search topic into said query template to form a search query string;

computer readable program code means for causing a computer to query said URL with said query string comprising said identified DTD and said at least one search topic;

computer readable program code means for causing a computer to retrieve at least one result of said query, thereby automatically simulating user interaction with said dynamic website to gather and extract said at least one result.

10. The computer product of claim 9 further comprising:

computer readable program code means for causing a computer to determine if said URL is to be searched with a second search topic;

computer readable program code means for causing a computer to perform a second query of said URL with said DTD and said second search topic;

computer readable program code means for causing a computer to retrieve at least one result of said second query; and computer readable program code means for causing a computer to repeat the foregoing steps for a plurality of search topics to be searched on said URL.

11. The computer product of claim 9 wherein said search query string is adapted to be submitted to said URL to perform a hypertext transfer protocol request.

12. The computer product of claim 9 further comprising:

computer readable program code means for causing a computer to determine if additional search results are available;

computer readable program code means for causing a computer to performing a page navigation to retrieve at least one additional search result from at least one page of search results.

13. A computer program product for automatically gathering dynamic content and resources on the world wide web, said computer program product comprising:

a site database of dynamic websites requiring interaction to download contents thereof, said site database containing session data for the dynamic websites and document type definitions including descriptions of how to interact with the dynamic websites; and a computer usable medium having computer readable program code means embodied in said medium for causing a computer to simulate user interaction and managing session information with a website, said computer program product having:

computer readable program code means for causing a computer to determine at least one dynamic website to be searched, said website having a uniform resource locator;

computer readable program code means for causing a computer to determine a session data and document type definition, from the site database, for said at least one dynamic website to be searched;

computer readable program code means for causing a computer to create a query template for a website to simulate user interaction, said query template containing said uniform resource locator and said document type definition describing how to interact with the uniform resource locator;

computer readable program code means for causing a computer to determine at least one search topic to be searched on said website;

computer readable program code means for causing a computer to insert said topic into said query template to form a search query string;

computer readable program code means for causing a computer to query said website with said query string;

computer readable program code means for causing a computer to receive at least one result from said query;

computer readable program code means for causing a computer to determine if there is a second search topic to be searched on said website;

computer readable program code means for causing a computer to create a second search query string containing said uniform resource locator and said document type definition for said website and said second topic to be searched;

computer readable program code means for causing a computer to execute a second query of said website with said second search query string;

computer readable program code means for causing a computer to receive at least one result from said second query;

computer readable program code means for causing a computer to execute a plurality of queries for a plurality of search topics to be searched on said website, thereby automatically simulating user interaction with said website to gather and extract results from said website.

14. An automated method of gathering and extracting content and information from a dynamic website comprising the steps of:

identifying and retrieving a uniform resource locator ("URL") for a website to be searched;

determining from the site database if said URL is a dynamic website requiring interaction to download content thereof;

if said URL is a dynamic website, obtaining a session data for said URL and storing said data in a site database of dynamic websites, said site database further containing document type definitions including descriptions of how to interact with the dynamic websites;

formatting a query template for said URL using said session data and a document type definition describing how to interact with the dynamic website from said site database to simulate user interaction;

formatting said query template with a first topic to be searched to form a first search query string;

performing a hypertext transfer protocol request of said dynamic website with said first search query string;

processing a first set of search results for said first search query string, thereby automatically simulating user interaction with said dynamic website to gather and extract said set of search results from said dynamic website.

15. The method of claim 14 further comprising the steps of:

determining if there is at least one additional topic to be searched on said website;

inserting said at least one additional topic into said search query string to form at least one additional topic search query string;

performing a hypertext transfer protocol request of said website with said at least one additional topic search query string;

processing at least one additional topic set of search results for said at least one additional topic search query string;

repeating the foregoing for a plurality of at least one additional topic to be searched on said website.

16. The method of claim 14 wherein said step of determining if said URL is a dynamic website further comprises the steps of:

performing a hypertext transfer protocol GET method of said website;

downloading a content of said website into said site database, said content containing a header;

scanning said header for said session data, said session data represented by a cookie.

17. An article of manufacture comprising:

a site database of dynamic websites requiring interaction to download contents thereof, said site database containing session data for the dynamic websites and document type definitions including descriptions of how to interact with the dynamic websites; and a computer usable medium having computer readable program code means for automatically gathering and extracting content and information from a dynamic website, the computer readable program code means in said article of manufacture comprising:

computer readable program code means to identify and retrieve a URL for a website to be queried;

computer readable program code means to determine if said URL is a dynamic website requiring interaction to download content thereof;

computer readable program code means for obtaining a session data for said URL and storing said data in said site database;

computer readable program code means for formatting a query template for said URL using said session data and a document type definition describing how to interact with the dynamic website from said site database to simulate user interaction;

computer readable program code means for formatting said query template with a first topic to be searched to form a first search query string;

computer readable program code means for performing a hypertext transfer protocol request of said dynamic website with said first search query string;

computer readable program code means for processing a first set of search results for said first search query string, thereby automatically simulating user interaction with said dynamic website to gather and extract said set of search results from said dynamic website.

18. The article of manufacture of claim 17 wherein said computer readable program code means to determine if said URL is a dynamic website comprises:

computer readable program code means for performing a hypertext transfer protocol GET method of said website;

computer readable program code means for downloading a content of said website into said site database, said content containing a header;

computer readable program code means scanning said header for said session data, said session data represented by a cookie.

19. A computer program product comprising:

a site database of dynamic websites requiring interaction to download contents thereof, said site database containing session data for the dynamic websites and document type definitions including descriptions of how to interact with the dynamic websites; and a computer usable medium having computer readable program code means embodied in said medium for of gathering and extracting content and information from a dynamic website, said computer program product having:

computer readable program code means for causing a computer to identify and retrieve a uniform resource locator ("URL") for a website to be searched;

computer readable program code means for causing a computer to determine if said URL is a dynamic website requiring interaction to download content thereof;

computer readable program code means for causing a computer to obtain a session data for said URL and storing said data in said site database;

computer readable program code means for causing a computer to format a query template for said URL using said session data and a document type definition describing how to interact with the dynamic website from said site database to simulate user interaction;

computer readable program code means for causing a computer to format said query template with a first topic to be searched to form a first search query string;

computer readable program code means for causing a computer to perform a hypertext transfer protocol request of said dynamic website with said first search query string;

computer readable program code means for causing a computer to process a first set of search results for said first search query string, thereby automatically simulating user interaction with said dynamic website to gather and extract said set of search results from said dynamic website.

20. The computer program product of claim 19, wherein said computer readable program code means for causing a computer to determine if said URL is a dynamic website comprises:

computer readable program code means for causing a computer to perform a hypertext transfer protocol GET method of said website;

computer readable program code means for causing a computer to download a content of said website into said site database, said content containing a header;

computer readable program code means for causing a computer to scan said header for said session data, said session data represented by a cookie.

* * * * *